(12) United States Patent
Phillips

(10) Patent No.: US 8,579,751 B2
(45) Date of Patent: Nov. 12, 2013

(54) HYBRID POWERTRAIN WITH LAYSHAFT TRANSMISSION AND ELECTRIC TORQUE CONVERTER AND METHOD OF CONTROLLING SAME

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/358,874

(22) Filed: Jan. 26, 2012

(65) Prior Publication Data

US 2013/0196805 A1    Aug. 1, 2013

(51) Int. Cl.
*F16H 3/72*    (2006.01)
*F16H 37/06*    (2006.01)

(52) U.S. Cl.
USPC .............................................. 475/5; 475/221

(58) Field of Classification Search
USPC ............ 475/5, 118, 207, 220, 221, 269, 323, 475/302, 343; 903/909, 910, 912; 74/220, 74/331, 339
See application file for complete search history.

(56) References Cited

U.S. PATENT DOCUMENTS

| | | | |
|---|---|---|---|
| 7,427,252 B2 | 9/2008 | Holmes | |
| 7,479,081 B2 * | 1/2009 | Holmes | 475/5 |
| 7,575,529 B2 | 8/2009 | Holmes | |
| 8,075,436 B2 * | 12/2011 | Bachmann | 475/5 |
| 8,257,213 B2 * | 9/2012 | Komada et al. | 475/5 |
| 2003/0045389 A1 * | 3/2003 | Kima | 475/5 |
| 2007/0099738 A1 * | 5/2007 | Holmes | 475/5 |
| 2010/0179024 A1 | 7/2010 | Holmes | |
| 2011/0111910 A1 * | 5/2011 | Ideshio et al. | 475/5 |

* cited by examiner

*Primary Examiner* — Justin Holmes
(74) *Attorney, Agent, or Firm* — Quinn Law Group, PLLC

(57) ABSTRACT

A powertrain has an electric torque converter that includes an electric motor/generator, and a differential gear set having a first member, a second member, and a third member. The powertrain includes a layshaft transmission having a first input member connected to the first member, a second input member connected to the second member, and having a plurality of selectively engageable torque-transmitting mechanisms each of which is selectively engageable to establish a different respective speed ratio through the transmission. At least one controller is provided, and the motor/generator is connected for common rotation with the third member and is controlled by said at least one controller to establish a speed of the third member that permits synchronous engagement and disengagement of the torque-transmitting mechanisms to shift from one of the respective speed ratios to a successive one of the respective speed ratios. A method of controlling the powertrain is also provided.

10 Claims, 2 Drawing Sheets

HYBRID POWERTRAIN WITH LAYSHAFT TRANSMISSION AND ELECTRIC TORQUE CONVERTER AND METHOD OF CONTROLLING SAME

TECHNICAL FIELD

The present teachings generally include a powertrain with an electric torque converter and a transmission.

BACKGROUND

A dual clutch transmission typically has dual input clutches or dual output clutches that are alternately engaged and disengaged in a slipping manner to alternate torque transferred from an input member to the different layshafts of the transmission as the transmission progresses through the available speed ratios. Such launch clutches have inherent heat and spin losses.

Single-motor hybrids usually require clutch-to-clutch shifts (i.e., shifts that involve energy losses) with associated spin losses and pump power requirements. Two-motor hybrid transmissions may allow synchronous shifts, but are typically expensive and difficult to package.

SUMMARY

A powertrain is provided that has an electric torque converter that includes an electric motor/generator, and a differential gear set having a first member, a second member, and a third member. The powertrain includes a layshaft transmission having a first input member connected to the first member, a second input member connected to the second member, and having a plurality of selectively engageable torque-transmitting mechanisms each of which is selectively engageable to establish a different respective speed ratio through the transmission. At least one controller is provided, and the motor/generator is connected for common rotation with the third member and is controlled by the controller to establish a speed of the third member that permits synchronous engagement and disengagement of the torque-transmitting mechanisms to shift from one of the respective speed ratios to a successive one of the respective speed ratios. A method of controlling a powertrain with a layshaft transmission and an electric torque converter to provide the synchronous shifts is also provided.

As used herein, "common rotation" means connected for rotation at the same speed. A "synchronous shift" is a disengagement of one torque-transmitting mechanism that establishes one speed ratio simultaneously with an engagement of another torque-transmitting mechanism that establishes a different speed ratio. Because the powertrain is configured to allow synchronous shifts, the torque-transmitting mechanisms may be dog clutches, which inherently have low energy losses.

In one embodiment, only one motor/generator is used, and the synchronous shifts eliminate spin losses and pump power requirements typically associated with single motor hybrids having plate clutches. With only one motor/generator, only one set of power electronics (i.e., a controller and a power inverter) is necessary. Additionally, the motor/generator may be a relatively low torque design. In another embodiment, a second motor/generator is added, enabling synchronous shifts even in an electric-only operating mode. In the embodiment having two motor/generators, the motor/generator that is included in the electric torque converter is packaged axially between the engine and the transmission, minimizing packaging space requirements.

The powertrain thus permits a layshaft transmission to achieve synchronous shifts and is an efficient alternative to a dual clutch layshaft transmission with its inherently high loss launch. Instead of friction losses and heat losses associated with a dual clutch layshaft transmission, the motor/generator can be controlled to function as a generator, converting mechanical energy of rotation in the transmission to energy stored in the battery, rather than wasting the energy as friction or lost heat.

The above features and advantages and other features and advantages of the present teachings are readily apparent from the following detailed description of the best modes for carrying out the present teachings when taken in connection with the accompanying drawings.

DETAILED DESCRIPTION

Figure 1:
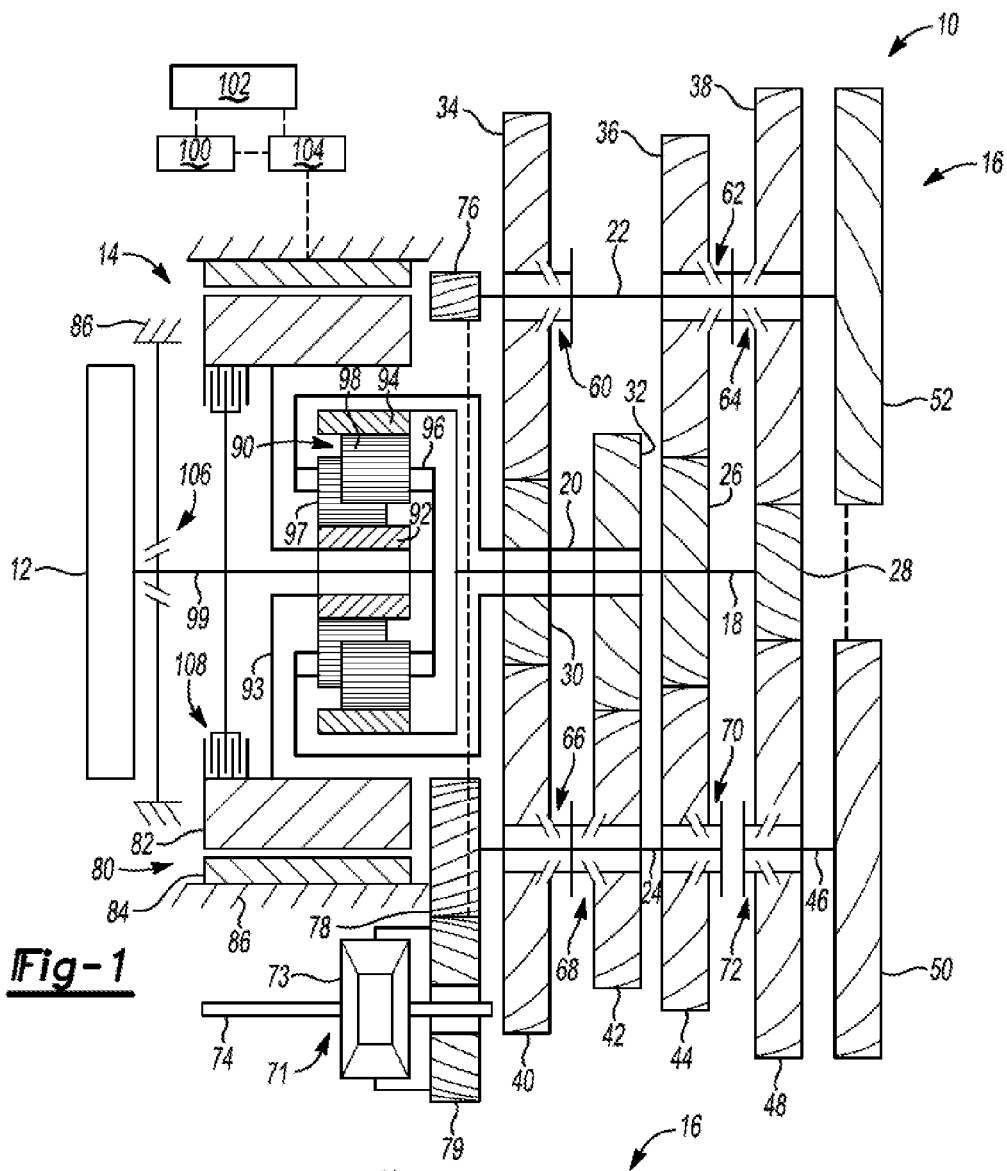
FIG. 1 is a schematic partially cross-sectional side view illustration of a first embodiment of a powertrain having a layshaft transmission and an electric torque converter with a planetary gear set and a motor/generator.

Referring to the drawings, wherein like reference numbers refer to like components throughout the several views, FIG. 1 shows a powertrain 10 that includes an engine 12, an electric torque converter 14, and a layshaft transmission 16. As discussed herein, the powertrain 10 can be used to establish a multitude of transmission ratios with only one relatively low torque motor/generator and synchronous shifts between successive speed ratios.

The transmission 16 has a first input shaft 18 and a second input shaft 20. The second input shaft 20 is configured as a sleeve shaft so that it is concentric with the first input shaft 18. The first input shaft 18 may be referred to as a first input member and the second input shaft 20 may be referred to as a second input member. A first layshaft 22 and a second layshaft 24 are arranged generally parallel with each other and with the input shafts 18, 20.

The transmission 16 includes a plurality of intermeshing gears. Gears 26 and 28 are mounted for common rotation with the first input shaft 18 and are referred to as a first set of input gears. The gears 30, 32 are mounted for common rotation with the second input shaft 20 and are referred to as a second set of input gears. Gears 34, 36 and 38 are a first set of layshaft gears, each mounted for rotation about the first layshaft 22, and selectively connectable for common rotation with the first layshaft 22 as discussed herein. Gears 40, 42 and 44 are a second set of layshaft gears, each mounted for rotation about the second layshaft 24, and selectively connectable for common rotation with the second layshaft 24 as discussed herein.

A third layshaft 46 is axially aligned with the second layshaft 24. A reversing gear set includes a first reverse gear 48 mounted to rotate about the third layshaft 46 and meshing with gear 28. A second reverse gear 50 is mounted for common rotation with the third layshaft 46. The second reverse gear 50 meshes with a third reverse gear 52 that is mounted for common rotation with the first layshaft 22. The layshafts 22, 24 and the input shafts 18, 20 are arranged in a triangular layout so that the gears 50 and 52 mesh with one another. In the two-dimensional schematic of FIG. 1, the meshing relationship of gears 50, 52 is represented by the dashed line connecting the gears 50, 52.

The transmission 16 includes a plurality of selectively engageable torque-transmitting mechanisms, each of which can be controlled to engage one of the layshaft gears to one of the layshafts. Specifically, torque-transmitting mechanism 60 is engageable to connect gear 34 for common rotation with the first layshaft 22. Torque-transmitting mechanism 62 is engageable to connect gear 36 for common rotation with the first layshaft 22. Torque-transmitting mechanism 64 is engageable to connect gear 38 for common rotation with the first layshaft 22. Torque-transmitting mechanism 66 is engageable to connect gear 40 for common rotation with the second layshaft 24. Torque-transmitting mechanism 68 is engageable to connect gear 42 for common rotation with the second layshaft 24. Torque-transmitting mechanism 70 is engageable to connect gear 44 for common rotation with the second layshaft 24. Torque-transmitting mechanism 72 is engageable to connect gear 48 for common rotation with the third layshaft 46.

The transmission 16 has a final drive 71 that includes a differential 73 with an output member 74 connected to drive vehicle wheels (not shown). The final drive 71 includes a gear train that includes gear 76 connected for common rotation with the first layshaft 22, gear 78 connected for common rotation with the second layshaft 24, and gear 79 connected for common rotation with a member of the differential 73. Due to the triangular arrangement of the layshafts 22, 24 with the input shafts 18, 20, both gear 76 and gear 78 mesh with gear 79. The meshing relationship of gear 76 and gear 79 is indicated by the dashed line between the gears 76, 79.

The electric torque converter 14 is integrated in the powertrain 10 and is configured to be controllable so that the torque-transmitting mechanisms can be synchronously shifted between successive speed ratios, without any slip or energy loss. That is, there is substantially a zero speed differential between the layshaft gear and the layshaft to which the layshaft gear is connected for common rotation when the respective torque-transmitting mechanism is engaged. The electric torque converter 14 includes an electric motor/generator 80 that has a rotor 82 and an annular stator 84 surrounding the rotor 82. The stator 84 is fixed to a stationary member 86, which in this case is the motor housing. The motor/generator 80 is referred to herein as the first motor/generator.

The electric torque converter 14 also includes a differential gear set 90, which in this embodiment is a compound planetary gear set. The differential gear set 90 includes a sun gear member 92 connected to the rotor 82 by a rotor hub 93 so that the sun gear member 92 rotates commonly with the rotor 82. The sun gear member 92 is configured as a sleeve to radially surround an input member 99 connected for rotation with the engine 12. As schematically illustrated in FIG. 1, the input member 99 extends through the central opening in the sun gear member 92. The differential gear set 90 also includes an annular ring gear member 94 radially surrounding the sun gear member 92 and connected for common rotation with the first input shaft 18. The differential gear set 90 includes a carrier member 96 that supports a first set of pinion gears 97 and a second set of pinion gears 98. The pinion gears 97 and 98 rotate relative to the carrier member 96. The first set of pinion gears 97 meshes with the sun gear member 92 and with the second set of pinion gears 98. The second set of pinion gears 98 meshes with the ring gear member 94. The carrier member 96 is connected for common rotation with the input member 99 and the engine 12. As used herein, the ring gear member 94 is referred to as a first member of the differential gear set 90, the carrier member 96 is referred to as the second member of the differential gear set 90, and the sun gear member 92 is referred to as the third member of the differential gear set 90.

Figure 2:
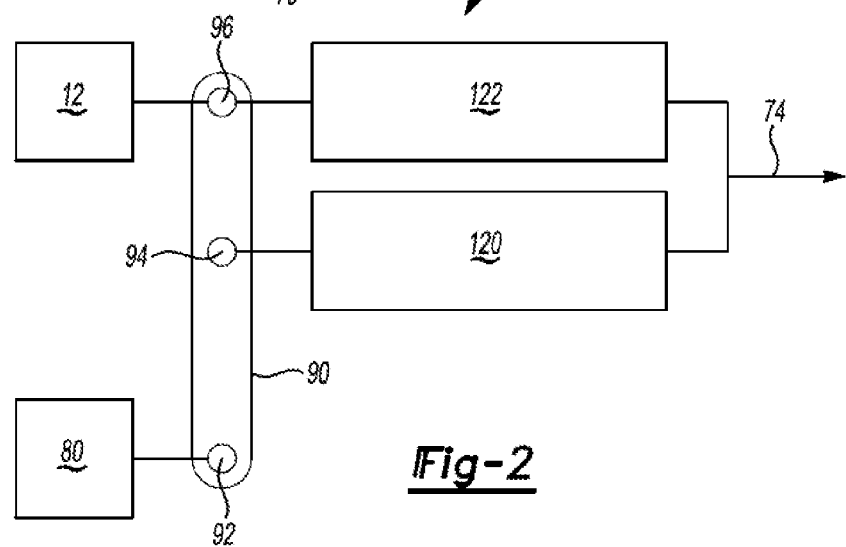
FIG. 2 is a schematic illustration in lever diagram form of the powertrain of FIG. 1.

FIG. 2 is a schematic illustration of the powertrain 10 in lever diagram form, illustrating the operative connection of the engine 12 to the carrier member 96, and the first motor/generator 80 to the sun gear member 92. The transmission 16 is represented with a first portion 120 that provides a power flow path to the output member 74 in the reverse, first, third, and fifth speed ratios. The first portion 120 includes the first input shaft 18, the first set of input gears 26, 28, the gears 36, 38, 44 and the reversing gear set 48, 50, 52. The transmission 16 includes a second portion 122 that provides a separate power flow path to the output member 74 in the second, fourth, and sixth speed ratios. The second portion 122 includes the second input shaft 20, the second set of input gears 30, 32, and the gears 34, 40, and 42.

A controller 100 controls the motor/generator 80 to function as a motor or as a generator. When the motor/generator 80 functions as a motor, power is supplied to the stator 84 from an energy storage device 102, such as a battery or battery module. A power inverter 104 converts the stored energy from a direct current to an alternating current supplied to the stator 84. For example, if the motor/generator 80 is a permanent magnet motor, the power flows to electrical windings (not shown) in the stator 84, which creates magnetic flux that drives the rotor 82. The amount of energy supplied to the stator 84 controls the speed of rotation of the rotor 82 and thus the speed of the sun gear member 92. Increasing the speed of the sun gear member 92 via the motor/generator 80 also affects the speed of one or both of the ring gear member 94 and the carrier member 96.

The controller 100 can also cause the motor/generator 80 to function as a generator, converting mechanical energy of the sun gear member 92 to electrical energy stored in the energy storage device 102. This slows the sun gear member 92, and also affects the speeds of one or both of the ring gear member 94 and the carrier member 96.

The differential gear set 90 is thus configured to create an input-split power flow, with the engine 12 providing driving power to the carrier member 96 and the second input shaft 20, the motor/generator 80 providing power to or receiving power from the sun gear member 92, and the ring gear member 94 providing power to or receiving power from the first input shaft 18. The speed of the ring gear member 94 is affected by both the engine 12 and the motor/generator 80. When the electric torque converter 14 is analyzed as a lever diagram by one skilled in the art, the differential gear set 90 is a lever with the sun gear member 92, the ring gear member 94, and the carrier member 96 being nodes. The ring gear member 94 is referred to as the input-split node.

The motor/generator 80 is controlled so that the torque-transmitting mechanisms can be synchronously shifted between successive speed ratios, without any slip or energy loss due to spin losses. In fact, the torque-transmitting mechanisms engaged in successive speed ratios can be engaged at the same time when transitioning from one speed ratio to the successive speed ratio, essentially establishing two power flow paths at the same time. This allows the torque-transmitting mechanisms 60, 62, 64, 66, 68, 70 and 72 to be dog clutches, which are less complex than hydraulically-actuated plate clutches.

The controller 100 that is operatively connected to the motor/generator 80 may also be operatively connected to the torque-transmitting mechanisms 60, 62, 64, 66, 68, 70 and 72 for controlling engagement and disengagement of the torque-transmitting mechanisms. Alternatively, a separate controller may be used to control the torque-transmitting mechanisms 60, 62, 64, 66, 68, 70 and 72.

To launch the powertrain 10 to provide reverse propulsion of a vehicle and establish a reverse speed ratio, the torque-transmitting mechanism 72 is engaged. Prior to starting the engine 12, both the first reverse gear 48 and the third layshaft 46 are at zero speed, and the torque-transmitting mechanism 72 can thus be engaged without slip or energy loss. The engine 12 is then started and the motor/generator 80 is controlled to function as a generator, absorbing some of the engine power. Torque provided at the ring gear member 94 and the first input shaft 18 is transferred through the intermeshing gears 28, 48 and the third layshaft 46 to the meshing second and third reverse gears 50, 52 to the first layshaft 22 and the final drive 71. In the reverse speed ratio, the direction of rotation of the output member 74 is opposite to the direction of rotation of the output member 74 in each of the forward speed ratios described herein.

To launch the powertrain 10 to provide forward propulsion of a vehicle and establish the first forward speed ratio, the torque-transmitting mechanism 62 is engaged. Prior to starting the engine 12, both the gear 36 and the first layshaft 22 are at zero speed, so the torque-transmitting mechanism 62 is engaged without slip or energy loss. The engine 12 is then started and the motor/generator 80 is controlled to function as a generator, absorbing some of the engine power. Torque provided at the ring gear member 94 and the first input shaft 18 is transferred through the intermeshing gears 26, 36 to the first layshaft 22, and the final drive 70.

Operating conditions such as engine speed and the speed of the output member 74 are monitored by the controller 100, or by one or more additional controllers. When engine speed reaches a predetermined speed, shifting to a higher speed ratio will allow the engine 12 to operate at speeds within its optimal speed range, while providing the requisite speed at the output member 74. The speed ratio through the transmission 16 is determined by the gear ratios of the intermeshing gears carrying torque. As used herein, the speed ratio is the ratio of the speed of output member 74 to the speed of whichever one of the first input shaft 18 or the second input shaft 20 is carrying torque.

To shift from the first speed ratio to the second speed ratio, the engine speed is controlled so that the speed of the second input shaft 20, and specifically the gear 30 rotating therewith, causes the speed of the gear 34 meshing with the gear 30 to be the same as the speed of the first layshaft 22. The motor/generator 80 is controlled to ensure that the speed of the first layshaft 22 remains constant as the speed of the engine 12 is varied. The first layshaft 22 is already carrying torque. The torque-transmitting mechanism 60 is then engaged with zero slip or energy loss due to spin losses. The torque-transmitting mechanism 60 can be engaged simultaneously with the disengagement of the torque-transmitting mechanism 62, or both of the torque-transmitting mechanisms 60 and 62 can be momentarily simultaneously engaged prior to disengagement of the torque-transmitting mechanism 62. After the torque-transmitting mechanism 62 is disengaged, the engine speed can be varied as necessary to vary the speed of the output member 74.

To shift to the third speed ratio, the motor/generator 80 is controlled so that the speed of the first input shaft 18, and specifically gear 28 connected for rotation thereon, is such that the speed of the gear 38 is the same as the speed of the first layshaft 22. This allows the torque-transmitting mechanism 64 to be engaged with zero slip or energy loss due to spin losses. The torque-transmitting mechanism 64 can be engaged simultaneously with the disengagement of the torque-transmitting mechanism 60, or both of the torque-transmitting mechanisms 60 and 64 can be momentarily engaged prior to disengagement of the torque-transmitting mechanism 60. After the torque-transmitting mechanism 60 is disengaged, the engine speed can be varied as necessary to vary the speed of the output member 74.

To shift to fourth speed ratio, the engine speed and the motor/generator 80 are controlled so that the desired speed of the output member 74 is maintained in the third speed ratio while the speed of the gear 40 is brought to the same speed as the second layshaft 24 which will be determined by the speed of the gear 78 of the final drive 71. The torque-transmitting mechanism 66 can then be engaged with zero slip or energy loss due to spin losses. The torque-transmitting mechanism 66 can be engaged simultaneously with the disengagement of the torque-transmitting mechanism 64, or both of the torque-transmitting mechanisms 64 and 66 can be momentarily engaged prior to disengagement of the torque-transmitting mechanism 64. After the torque-transmitting mechanism 64 is disengaged, the engine speed can be varied as necessary to vary the speed of the output member 74.

To shift to the fifth speed ratio, the engine speed and the motor/generator 80 are controlled so that the speed of the ring gear member 94, the first input shaft 18, and the gear 26 is such that the speed of the gear 44 is brought to the same speed as the second layshaft 24. The torque-transmitting mechanism 70 can then be engaged with zero slip or energy loss due to spin losses. The torque-transmitting mechanism 70 can be engaged simultaneously with the disengagement of the torque-transmitting mechanism 66, or both of the torque-transmitting mechanisms 70 and 66 can be momentarily engaged prior to disengagement of the torque-transmitting mechanism 66. After the torque-transmitting mechanism 66 is disengaged, the engine speed can be varied as necessary to vary the speed of the output member 74.

To shift to the sixth speed ratio, the engine speed is controlled so that the speed of the second input shaft 20, and specifically the gear 32 rotating thereon, causes the speed of the gear 42 meshing with the gear 32 to be the same as the speed of the second layshaft 24. The motor/generator 80 is controlled to ensure that the speed of the second layshaft 24 is appropriate to provide the desired speed ratio of the output member 74 as the speed of the engine 12 is varied. The second layshaft 24 is already carrying torque. The torque-transmitting mechanism 68 is then engaged with zero slip or energy loss due to spin losses. The torque-transmitting mechanism 68 can be engaged simultaneously with the disengagement of the torque-transmitting mechanism 72, or both of the torque-transmitting mechanisms 72 and 68 can be momentarily engaged prior to disengagement of the torque-transmitting mechanism 72. After the torque-transmitting mechanism 72 is disengaged, the engine speed can be varied as necessary to vary the speed of the output member 74.

Although the transmission 16 is configured to provide six forward speed ratios as described above, fewer or more forward speed ratios each permitting synchronous shifts with no energy loss due to spin losses can be provided by decreasing or increasing the number of intermeshing gears and selectively engageable torque-transmitting mechanisms. Although the synchronous shifts are described herein as upshifts, synchronous shifts with no energy losses due to spin losses are also achieved for downshifts between successive speed ratios.

Accordingly, because the electric torque converter 14 and the layshaft transmission 16 are configured to allow the engagement and disengagement of torque-transmitting mechanisms 60, 62, 64, 66, 68, 70, 72 for successive speed ratios to be made with zero slip or energy loss due to spin losses, the torque-transmitting mechanisms can be dog clutches.

In addition to the use of the motor/generator 80 to accomplish the zero energy shifts, the electric torque converter 14 allows the powertrain 10 to be operated in an electric-only mode. A grounding clutch 106 is provided that is selectively engageable to ground the input member 99 (and thus the engine 12 and the carrier member 96) to the stationary member 86. This allows the differential 90 to transmit torque from the sun gear member 92, powered by the motor/generator 80 functioning as a motor, to the ring gear member 94 and the first input shaft 18. Any of the torque-transmitting mechanisms 62, 64, 70 or 72 can then be engaged to transmit torque through the transmission 16 to the output member 74. Prior to engagement of the grounding clutch 106, the motor/generator 80 can be controlled to slow the input member 99, if the input member 99 is not already stationary. The grounding clutch 106 can then be engaged with zero slip or energy loss due to spin losses. This enables a dog clutch to be used for the grounding clutch 106 if desired.

In the embodiment of FIG. 1, the electric torque converter 14 has a plate clutch 108 that is engageable to connect the carrier member 96, the input member 99 and the engine 12 for common rotation with the rotor 82. When the clutch 108 is engaged, the engine 12 and the rotor 82 rotate at the same speed. The motor/generator 80 can be controlled to function as a motor so that power is provided by both the motor/generator 80 and the engine 12 to the same gears of the transmission 16 carrying torque, which will be dependent on which one of the torque-transmitting mechanisms 60, 62, 64, 66, 68, 70, 72 is engaged. With both the motor/generator 80 and the engine 12 providing torque, a relatively strong forward drive can be achieved.

Figure 3:
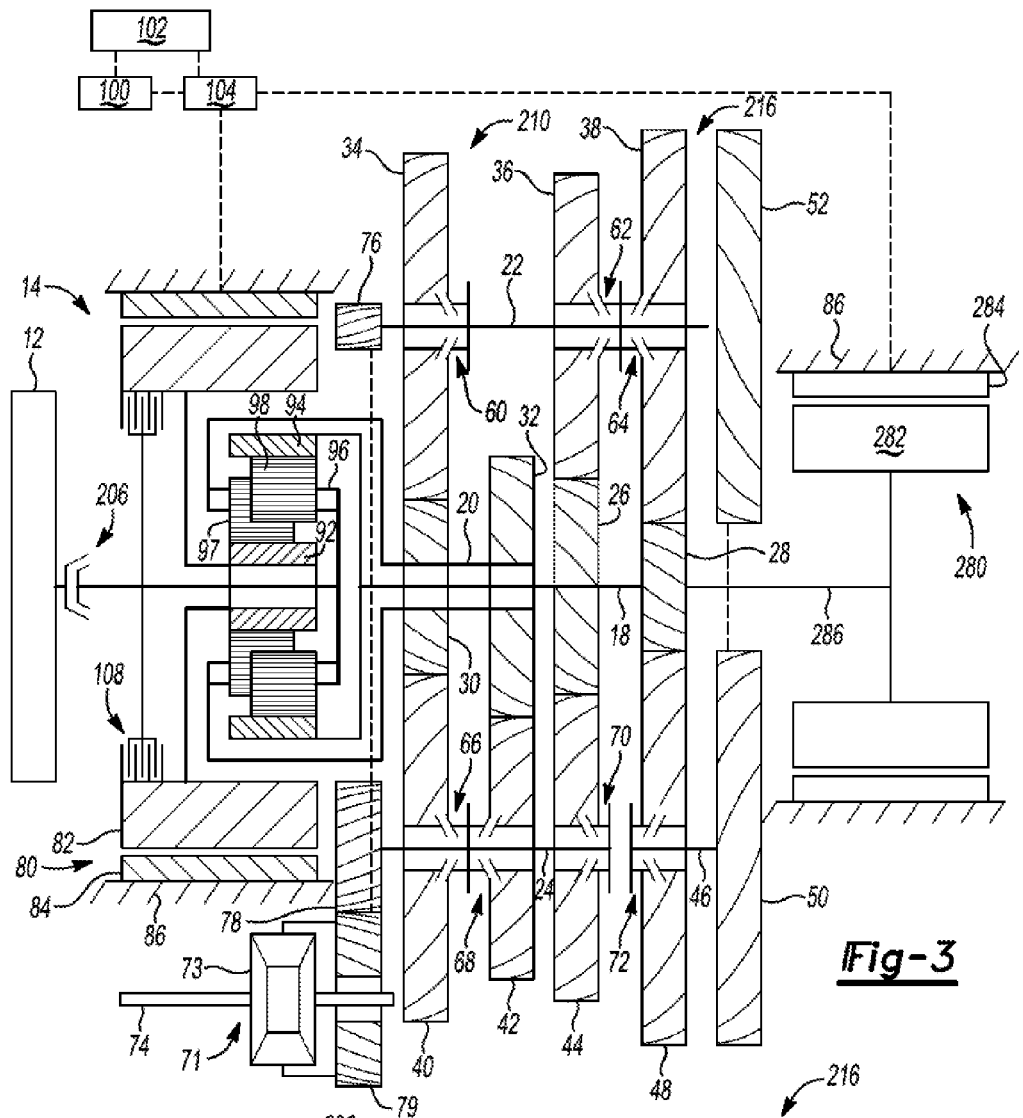
FIG. 3 is a schematic partially cross-sectional side view illustration of a second embodiment of a powertrain having a layshaft transmission and an electric torque converter with a planetary gear set and a first motor/generator, and also having a second motor/generator.

FIG. 3 is another embodiment of a powertrain 210 having many of the same components as the powertrain 10. The powertrain 210 has a transmission 216 with an additional motor/generator 280 referred to as the second motor/generator. The motor/generator 280 has a rotor 282 connected for rotation with the first input shaft 18 by an extension 286 of the first input shaft 18. The motor/generator 280 also has an annular stator 284 surrounding the rotor 282 and operatively connected to the controller 100, battery 102 and power inverter 104 to receive power from the battery 102 or provide power to the battery 102. In other embodiments, the motor/generator 280 could be positioned to drive a gear that meshes with either gear 36 or gear 38, and thereby indirectly provides torque to or receives torque from the first input shaft 18 through the intermeshing gears.

Figure 4:
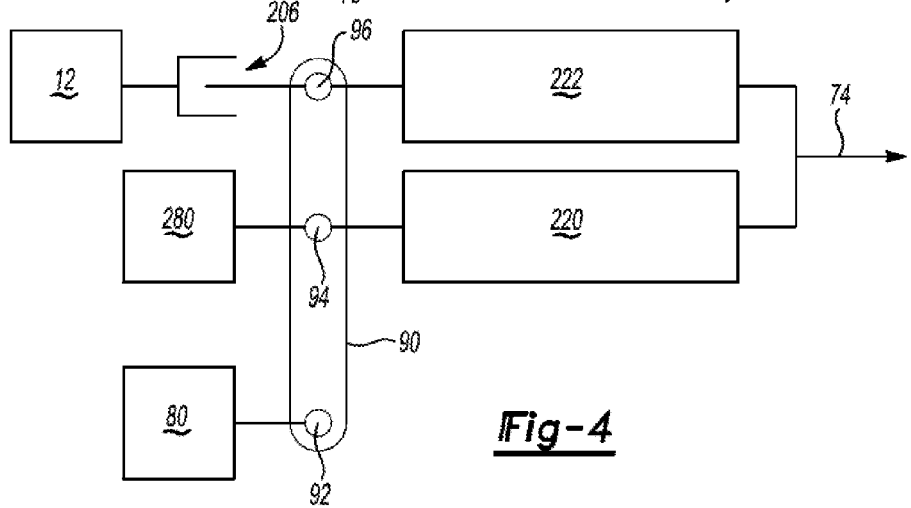
FIG. 4 is a schematic illustration in lever diagram form of the powertrain of FIG. 3.

FIG. 4 is a schematic illustration of the powertrain 210 in lever diagram form, illustrating the operative connection of the engine 12 to the carrier member 96 (when an engine disconnect clutch 206 is engaged), the first motor/generator 80 to the sun gear member 92, and the second motor/generator 280 to the ring gear member 94. The transmission 216 is represented with a first portion 220 providing a power flow path to the output member 74 in the reverse, first, third, and fifth speed ratios, and a second portion 222 providing a separate power flow path to the output member 74 in the second, fourth, and sixth speed ratios. The first portion 220 includes the first input shaft 18, the first set of input gears 26, 28 and gears 36, 38, 44 and the reversing gear set 48, 50, 52. The second portion 222 includes the second input shaft 20, the second set of input gears 30, 32, and the gears 34, 40, and 42.

With the addition of the motor/generator 280, the ring gear member 94 of the differential 90 can be varied by controlling the speed of the rotor 282 and by controlling the motor/generator 280 to function as a motor or as a generator. Power flows in the same paths as described for each speed ratio with respect to the powertrain 10. Synchronous shifts between successive speed ratios as described above with respect to the powertrain 10 are achieved by controlling the speeds of any of the members of the differential gear set 90 (i.e., the sun gear member 92 by controlling the speed of the motor/generator 80, the ring gear member 94 by controlling the speed of the motor/generator 280, and the carrier member 96 by controlling the speed of the engine 12).

The powertrain 210 can achieve an efficient electric-only operating mode by using both motor/generators 80, 280 as motors or generators in tandem to achieve the necessary speeds at the output member 74 and at each of the input shafts 18, 20 and layshafts 22, 24 as needed to accomplish synchronous engagements and disengagements of the torque-transmitting mechanisms 60, 62, 64, 66, 68, 70, 72. Because there are two motor/generators 80, 280, the speeds of the sun gear member 92 and the ring gear member 94 can be varied by motor/generators 80, 280, respectively, and the synchronous shifts can be achieved in the electric-only operating mode as well as in the hybrid operating mode.

The grounding clutch 106 of the powertrain 10 may be replaced by an engine disconnect clutch 206 to improve efficiency by disconnecting the engine 12 from the electric torque converter 14 and transmission 216 during the electric-only operating mode. Furthermore, during the electric-only operating mode, the motor/generators 80, 280 can be used to slow the speed of the carrier member 96 to zero, allowing the disconnect clutch 206 to be engaged at zero energy, without slip. The motor/generators 80, 280 can then be controlled to increase the speed of the carrier member 96 to start the engine 12.

Although the powertrain 10 is shown in FIG. 1 having a grounding clutch 106 and the powertrain 210 of FIG. 3 is shown having an engine disconnect clutch 206, an engine disconnect clutch could instead be used with the single motor embodiment of FIG. 1, and a grounding clutch could be used with the two motor embodiment of FIG. 3. In these alternative configurations, the synchronous shifting allowing engagement of torque-transmitting mechanisms in two successive speed ratios at the same time with zero slip would still be achievable.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A powertrain comprising:
an electric motor/generator;
a differential gear set having a first member, a second member, and a third member;
a layshaft transmission having a first input member connected to the first member and a second input member connected to the second member and having a plurality of torque-transmitting mechanisms each of which is selectively engageable to establish a different respective speed ratio through the transmission;

at least one controller;

wherein the motor/generator is connected for common rotation with the third member and is controlled by said at least one controller to establish a speed of the third member that permits simultaneous engagement and disengagement of the torque-transmitting mechanisms to shift from one of the respective speed ratios to a successive one of the respective speed ratios;

a stationary member; and a clutch selectively engageable to connect the second member to the stationary member, thereby enabling an electric-only operating mode when the motor/generator is controlled to function as a motor and any one of the torque-transmitting mechanisms is engaged.

2. The powertrain of claim 1, wherein the motor/generator is the only motor/generator operatively connected to the layshaft transmission.

3. The powertrain of claim 1, wherein the clutch and the torque-transmitting mechanisms are dog clutches.

4. The powertrain of claim 1, further comprising:

a friction plate clutch selectively engageable to connect the second member for common rotation with the motor/generator.

5. A powertrain comprising:

an engine;

a transmission having:
   a first input shaft;
   a second input shaft concentric with the first input shaft;
   a first layshaft;
   a second layshaft; wherein the first and second layshafts are substantially parallel with the first and second input shafts;
   a plurality of intermeshing gears including a first set of input gears mounted for common rotation with the first input shaft, a second set of input gears mounted for common rotation with the second input shaft, a first set of layshaft gears mounted to rotate about the first layshaft, and a second set of layshaft gears mounted to rotate about the second layshaft;
   a final drive operatively connected to both the first layshaft and the second layshaft;
   a plurality of torque-transmitting mechanisms each selectively engageable to connect a respective one of the layshaft gears for common rotation with a respective one of the layshafts, successive engagement of each of the torque-transmitting mechanisms establishing successive speed ratios between the engine and the final drive; wherein each of the torque-transmitting mechanisms is a dog clutch;

an electric torque converter including a motor/generator and a differential gear set that has a first member, a second member, and a third member; wherein the first member is connected for common rotation with the first input shaft, the second member is connected for common rotation with the second input shaft and is connected or connectable to the engine, and the third member is connected for common rotation with the motor/generator;

at least one controller;

wherein the motor/generator and the torque-transmitting mechanisms are controlled by said at least one controller to establish synchronous shifts between the successive speed ratios;

a third layshaft axially aligned with the second layshaft;

a reversing gear set including:
   a first reverse gear mounted to rotate about the third layshaft and meshing with one of the gears of the first set of gears;
   a second reverse gear mounted for common rotation with the third layshaft;
   a third reverse gear mounted for common rotation with the first layshaft and meshing with the second reverse gear;
   a reverse torque-transmitting mechanism selectively engageable to connect the first reverse gear for common rotation with the third layshaft; and
   wherein engagement of the reverse torque-transmitting mechanism causes an output member of the final drive to rotate in an opposite direction than when any one of the plurality of torque-transmitting mechanisms is engaged.

6. The powertrain of claim 5, wherein the motor/generator is the only motor/generator operable to change the speed of rotation of any one of the input shafts and any one of the layshafts.

7. The powertrain of claim 5, wherein the second member is connected for common rotation with the engine, and further comprising:

a stationary member; and a clutch selectively engageable to connect the second member of the differential mechanism to the stationary member, thereby enabling an electric-only operating mode when the motor/generator is controlled to function as a motor and any one of the torque-transmitting mechanisms is engaged.

8. The powertrain of claim 7, wherein the clutch and the torque-transmitting mechanisms are dog clutches and the motor/generator is controlled to allow synchronous engagement of each of the torque-transmitting mechanisms.

9. The powertrain of claim 5, further comprising:

a friction plate clutch selectively engageable to connect the second member for common rotation with the motor/generator.

10. A method of controlling a powertrain comprising:

controlling both the speed of a motor/generator operatively connected to a transmission and engagement of torque-transmitting mechanisms such that the torque-transmitting mechanisms are simultaneously engaged and disengaged to shift between subsequent speed ratios;

wherein the powertrain includes:
   a differential gear set having a first member, a second member, and a third member;
   a layshaft transmission having a first input member connected to the first member and a second input member connected to the second member; wherein the motor/generator is connected for common rotation with the third member;

engaging a clutch to ground the engine and the second member to a stationary member; and controlling the motor/generator to function as a motor to provide an electric-only operating mode.

* * * * *